United States Patent Office 3,600,363
Patented Aug. 17, 1971

3,600,363
POLYAMIDE HAVING CYCLOHEXANE RING PREPARED BY POLYMERIZING 4-AMINOMETHYL-CYCLOHEXANE-1-CARBOXYLIC ACID IN THE PRESENCE OF WATER
Shigeyuki Suzuki, Kanagawa, and Hitoshi Takita, Masaaki Takahashi, and Kiro Asano, Tokyo, Japan, assignors to Kureha Kagaku Kogyo Kabushiki Kaisha, Tokyo, Japan
No Drawing. Filed June 26, 1969, Ser. No. 836,969
Claims priority, application Japan, June 26, 1968, 43/44,107
Int. Cl. C08g 20/00, 20/02, 20/12
U.S. Cl. 260—78                                        8 Claims

ABSTRACT OF THE DISCLOSURE

A process for producing a polymer of 4-aminomethyl-cyclohexane-1-carboxylic acid, or a copolymer of the acid with ε-caprolactam including conducting the polymerization in the presence of from 20 to 150% water, and at a temperature of from 180 to 340° C.

BACKGROUND OF THE INVENTION

(1) Field of the invention

The present invention relates to a polyamide having a cyclohexane ring and a process for producing the same. More particularly, the invention is concerned with a polyamide having a high melting point, excellent crystallinity, and a very high rate of crystallization, and a process for producing the polyamide by polymerizing 4-aminomethyl-cyclohexane-1-carboxylic acid (hereinafter is called "I"), alone or copolymerizing I with ε-caprolactam in the presence of a large amount of water in each case.

(2) Description of the prior art

Polymerization and a copolymerization of 4-amino-methylcyclohexane-1-carboxylic acid has already been disclosed in the specification of U.S. Pat. No. 2,910,457 (1959). In the patented process, a polyamide having a melting point higher than that of 6-nylon (poly-ε-caprolactam) is prepared by copolymerizing the amine acid (I) and ε-caprolactam under heating. Also, fibers having a high Young's modulus are obtained from the polyamide. The compound used in the patent is one prepared by the reduction of p-cyano benzoic acid and mainly has a cis structure. The configuration of the monomer unit of carboxylic acid in the copolymer, thus prepared, is considered to be mainly composed of cis form also.

In general, the production of a polyamide having a cyclohexane ring is accomplished by using a mixture of cis and trans isomers that are formed during the preparation of the monomer. The ratio of cis to trans forms in the mixture varies according to the reaction conditions employed. Therefore, the properties of polymers having cyclohexane rings prepared by the polymerization of such monomers is greatly influenced by the properties of the steric structure of the cyclohexane unit in the polymer. Consequently, the difference in steric structure of the monomers gives remarkable influences on the properties of the polymer prepared therefrom, and it is quite difficult to obtain polymers having constant or definite properties regardless of the steric structures of the monomers used as the starting materials. Therefore, it has long been desired to find a process of producing the aforesaid polymers having constant properties regardless of the monomers used as the starting materials, whether cis form, trans form, or a mixture of cis and trans forms.

SUMMARY OF THE INVENTION

Therefore, an object of the present invention is to provide a process for preparing a polyamide having a cyclohexane ring and also having constant properties without being influenced by the structure of the monomer used as the starting material.

Another object of the present invention is to provide a process for preparing a polyamide having a cyclohexane ring and mainly having a trans structure using 4-amino-methylcyclohexane-1-carboxylic acid (I) regardless of said I being the cis isomer, the trans isomer or a mixture of cis and trans isomers.

Still another object of this invention is to provide a polyamide having a cyclohexane ring and excellent properties different from those of such known polyamides.

As the results of various investigations about the polymerization of the acid, the inventors have found that by heating the acid, or a mixture thereof with ε-caprolactam, for a definite period of time, for example, for from 3 to 10 hours, to a temperature of 200–300° C. and in a closed system, a polymer having substantially the trans structure is obtained. The heating is effected in the presence of water in a proportion of 20 to 150% by weight of the total monomers in the reaction system, and the polyamide produced contains more than 75% of the trans-configuration, in the monomer units regardless of the original structure of said monomer; whether being a cis form, a trans form, or a mixture of cis and trans forms. The polyamide prepared by the process of this invention is quite different from the polyamides prepared by conventional processes as to melting point, crystallinity, and crystallization velocity, as well as the properties of fibers and films prepared from the polyamides.

DETAILED DESCRIPTION OF THE INVENTION

In general, in the case of copolymerizing I and ε-caprolactam, I acts as a comonomer and simultaneously as a polymerization catalyst for ε-caprolactam. Therefore, the copolymerization proceeds fast without the addition of water and hence the addition of water is unnecessary for conducting the copolymerization thereof. In fact, in the process disclosed in U.S. Pat. No. 2,910,457, shown above, the production of polyamides is conducted only by heating the reaction system without the addition of water. Although there are no descriptions about the steric structures of the polymers in the above patent, the inventors have confirmed by the results of measuring the steric structures of polyamides prepared by the process of the patent, by means of nuclear magnetic resonance spectra, that the proportion of the trans structure unit of carboxylic acid in the polymer is about 60%.

When the condensation reaction of I is carried out by heating it to a high temperature, the polymerization thereof occurs together with the isomerization thereof. Therefore, the polymerization conditions must be selected by considering the isomerization as well as the polymerization from a viewpoint of controlling the structure and the property of the polymer. As the results of the active investigations about the isomerization thereof, the inventors have found that by heating I or a mixture of I and ε-caprolactam to a temperature of higher than 200° C. in the presence of a large quantity of water to isomerize and polymerize, the isomerization thereof can be desirably controlled in a range of from 75 to 100% in the trans form if the proportion of water and the temperature are suitably selected in the aforesaid ranges.

Therefore, the feature of the present invention is to produce a polyamide containing cyclohexane ring, steric structure, and is composed mainly of the trans form by polymerizing I or I and ε-caprolactam by heating in the presence of water regardless of whether I is a cis isomer, a trans isomer or a mixture of cis and trans isomers.

The polyamides prepared by the process of this invention contain the following units:

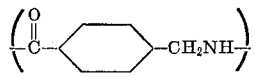

wherein the trans structure unit amounts to more than 75% of the polymer, and as is clear from that above, the proportion of the trans structure unit in polyamides prepared by conventional methods is less than 60%. The polymer of this invention is novel in steric structure. Moreover, the polyamide having more than 75% trans structure units has, unexpectedly, the following excellent features in properties. That is, the crystallinity of the polymer of I having about 85% trans structure unit was 60% (by X-ray diffraction measurement), while the crystallinity of the polymer having less than 60% trans structure unit was lower than 45%. Furthermore, when 30 mole percent I was copolymerized with ε-caprolactam, the crystallinity of the copolymer prepared with the addition of no water was only 40%, while the copolymer prepared according to the process of this invention was 55%. Moreover, the crystallization velocity at 170° of the copolymer prepared from 30 mole percent I and ε-caprolactam, according to the process of this invention, was about 4 times faster than that of a conventional copolymer having 60% trans structure units and 40% crystallinity. The crystallinity and the crystallization velocity of polyamides are very important factors when stabilizing of filaments of the polymer by spinning and stretching. In other words, the shrinkages of the monofilament of the copolymer prepared from 30 mole percent I and 70 mole percent ε-caprolactam was about 30% when the copolymer was prepared without the addition of water but was only 10% when prepared by the process of this invention.

The polymerization of I or the copolymerization of I and ε-caprolactam by the process of this invention is conducted at a temperature of 180 to 340° C. while supplying water to the reaction system in an amount of a 20 to 150% by weight, preferably 20 to 100% by weight of the whole amount of the monomers. The polymerization or the copolymerization is conducted under the above-mentioned conditions for 3 to 10 hours in a closed system under pressure of 5 to 50 kg./sq. cm. Thereafter, the closed reaction system is gradually released to a normal pressure and the polymerization is further conducted at a normal pressure for from 8 to 15 hours or is further conducted at a reduced pressure.

In addition, during the polymerization or the copolymerization of this invention; an inorganic acid, such as hydrochloric acid, sulfuric acid, phosphoric acid and the like; an organic acid, such as acetic acid, benzoic acid, and the like; an amine, such as n-butylamine, isopropylamine, and the like; and ammonia which are used usually in a conventional production of polyamides may be added together with water.

Furthermore, the copolymerization of I and ε-caprolactam by the process of this invention may be carried out in a desired monomer ratio. That is, the proportion of carboxylic acid (I) may be 1 to 99 mole percent. In particular, when I is in a range of 1 to 40 mole percent, a melt moldable polyamide is obtained.

The invention will be explained by referring to the following examples.

EXAMPLE I 30 g. of water and 100 g. of 4-aminomethylcyclohexane-carboxylic acid consisting of a mixture of cis and trans isomers (80% cis isomer and 20% trans isomer), prepared by reducing p-cyanobenzoic acid, were charged into an autoclave. After purging the autoclave with nitrogen, the system was closed and the reaction was conducted for 4 hours under a pressure of 27 kg./sq. cm. while heating to 260° C. Thereafter, the system was opened to atmospheric pressure, and the reaction was continued for 8 hours in a nitrogen atmosphere at normal pressure, and further for 2 hours at a reduced pressure of 10 mm. Hg.

The polymer withdrawn from the autoclave after the polymerization was a white solid and the crystallinity thereof by X-ray diffraction was 56%. Also, the polymer was dissolved in formic acid and the proportion of the trans structure units of the polymer was 82%, as measured by nuclear magnetic resonance spectra.

Further, the same polymerization procedure was conducted at a temperature of 240° C. or 280° C. and the crystallinity and the content of trans isomer of the product were measured, the results of which are shown in the following table. In addition, for comparison, a control polymer was prepared by conducting the similar polymerization without using water and the results of the measurement of the product are also shown in the same table.

|  | Polymerization temp. (° C.) | Percent Crystallinity | Percent Content of trans form |
|---|---|---|---|
| Amount of water (percent): |  |  |  |
| 30 | 240 | 52 | 75 |
| 30 | 260 | 56 | 82 |
| 30 | 280 | 60 | 85 |
| 0 (control) | 260 | 45 | 60 |

EXAMPLE II 100 g. of a mixture of the isomers of 4-aminomethylcyclohexane-1-carboxylic acid containing 80% cis isomer; 168 g. of ε-caprolactam, 54 g. of water, and benzoic acid in an amount of 0.25 mole percent of the total monomers were charged into an autoclave. After purging the autoclave with nitrogen, the mixture was reacted for four hours at a temperature of 260° C. under a pressure of 28 kg./sq. cm. Thereafter, the pressure was gradually reduced to normal pressure, and then the reaction was further conducted for 15 hours in a nitrogen atmosphere. After the polymerization was finished, the pellets of the polyamide were withdrawn from the autoclave, washed with water at 80 to 90° C. to remove monomers and oligomers, and dried for 20 hours at 100° C. in vacuo. The relatively viscosity of 1% solution of the polymer, thus obtained, was 2.58 in concentrated sulfuric acid at 20° C. Also, the melting point of the polymer, as measured by differential thermal analysis, was 238° C. and the secondary transition point of the polymer, as obtained by the measurement of the viscoelasticity thereof, was 100° C. Furthermore, the crystallinity thereof by X-ray diffraction was 55%, and also the crystallization velocity ($\eta \frac{1}{2}$) of the polymer, measured by a density gradient method at 170° C., was 12.5 seconds.

A filament obtained by melt spinning the copolymer, thus prepared, was stretched at 120° C. 4.5 times and then subjected to heat treatment at 160° C. to provide a stretched filament of 14 denier. The strength, initial Young's modulus, and shrinkage in boiling water at 95° C. of the stretched filament were 6.2 g./D, 50 g./D, and 10% respectively.

For comparison, a mixture of 100 g. of the aforesaid mixture of cis and trans isomers of 4-aminomethylcyclohexane-1-carboxylic acid was polymerized for 15 hours at 260° C. without using water under normal pressure and the polyamide obtained was measured to obtain the aforesaid properties. The results are shown in the following table together with the results of the process of this invention.

| Process | Relative viscosity [1] | Crystallinity (percent) | Crystallization velocity [2] | Melting point (° C.) | Shrinkage in boiling water (percent)[3] |
|---|---|---|---|---|---|
| (A) | 2.58 | 55 | 12.5 | 238 | 10 |
| (B) | 2.59 | 45 | 60 | 230 | 30 |

[1] $\eta$ of 1% solution of copolymer in $H_2SO_4$ at 20° C.
[2] $\eta \frac{1}{2}$ at 170° C (sec.).
[3] Shrinkage of stretched filament in boiling water at 95° C.

Note.—(A) The present invention; (B) conventional process.

What is claimed is:

1. A process for the production of a polyamide substantially containing trans structured units which comprises polymerizing 4-aminomethylcyclohexane-1-carboxylic acid by heating at a temperature of from 180° C. to 340° C. and under a pressure of from 5 to 50 kg./sq. cm. for from 3 to 10 hours in the presence of water in a proportion of 20 to 150% by weight of the total monomer.

2. The process as claimed in claim 1, wherein said polymerization is a copolymerization, and is conducted in the presence of ε-caprolactam as a monomer.

3. The process as claimed in claim 1, wherein said polyamide has the trans structure in the cyclohexane ring in a proportion of more than 75%.

4. The process as claimed in claim 1, wherein said temperature is from 200 to 300° C.

5. The process as claimed in claim 1, wherein water is present in an amount of from 20 to 100% by weight.

6. A process for the production of a polyamide which comprises polymerizing a member selected from the group consisting of cis-4-aminomethylcyclohexane-1-carboxylic acid, trans-4-aminomethylcyclohexane-1-carboxylic acid and mixtures thereof with ε-caprolactam wherein said acid is present in an amount of 1 to 99 mole percent, in the presence of from 20 to 100% by weight, based on the total monomers, of water, at a temperature of from 200 to 300° C. and at from 5 to 50 kg./sq. cm. pressure, said polymer containing more than 75% trans cyclohexane monomer units.

7. The process as claimed in claim 6, wherein said acid is present in an amount of from 1 to 40 mole percent.

8. Filaments prepared by the melt spinning or wet or dry spinning of the polyamide prepared by the process of claim 1.

References Cited

UNITED STATES PATENTS

| | | | |
|---|---|---|---|
| 2,500,317 | 3/1950 | Lincoln | 260—78 |
| 2,910,457 | 10/1959 | Temin et al. | 260—78 |
| 3,037,002 | 5/1962 | Pietrusza et al. | 260—78 |

OTHER REFERENCES

Journal of Polymer Science, vol. 49, 1961, pp. 241–245, Levine et al.

Chem. Abstracts, vol. 56, 1962, 5880i–5881a–d, Bogdanov et al.

WILLIAM H. SHORT, Primary Examiner

H. SCHAIN, Assistant Examiner

U.S. Cl. X.R.

260—31.2; 264—176, 184, 205